United States Patent Office 3,544,647
Patented Dec. 1, 1970

3,544,647
OLEFIN CONVERSION AND CATALYST THEREFOR
Filippo Pennella, Bartlesville, Okla., assignor to Phillips Petroleum Company, a corporation of Delaware
No Drawing. Filed Apr. 3, 1967, Ser. No. 627,630
Int. Cl. C07c 3/62
U.S. Cl. 260—683    9 Claims

ABSTRACT OF THE DISCLOSURE

Olefins are converted to other olefins having different numbers of carbon atoms per molecule by contact with a catalyst, active for disproportionating propylene into ethylene and butene at temperatures in the range of 400 to 1200° F, which has been treated with hydrogen chloride prior to use. Hydrocarbon chlorides which decompose at treating conditions to form hydrogen chloride can be used.

---

This invention relates to the conversion of olefin hydrocarbons and to a catalyst for such conversion. In one aspect, this invention relates to the olefin reaction. In still another aspect, the invention relates to a method for pretreating an olefin reaction catalyst to improve the activity of the catalyst for the olefin reaction.

The olefin reaction is defined as a process for the catalytic conversion over a catalyst of a feed comprising one or more ethylenically unsaturated compounds to produce a resulting product which contains at least ten per cent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five per cent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono-or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or ployenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

It is an object of this invention to provide a method for increasing the activity of an olefin reaction catalyst. It is also an object of this invention to provide an improved catalyst for an olefin reaction. Other objects and advantages will be apparent to those skilled in the art upon study of the present disclosure including the detailed description of the invention.

The inventive concept of the present invention lies in the discovery that the activity of the olefin reaction catalysts can be improved by contact with hydrogen chloride or hydrocarbon chlorides decomposable to hydrogen chloride prior to use in the olefin reaction. Thus, it has been found that equilibrium conversions can now be reached at somewhat milder operating conditions. Further, the conversion level at relatively low temperatures can be greatly increased.

The above-mentioned improvements are achieved by subjecting the catalyst, which has undergone the conventional activation or regeneration, to the action of a stream of hydrogen chloride while at a temperature within the range of about 575 to 1475° F. and at a pressure of about 0–500, preferably about 0 to 100 p.s.i.g. Hydrocarbon chlorides can also be used as the treating agent and chloro derivatives of paraffins, olefins, aromatics, and the like, can be used for this purpose. Some examples of these are vinyl chloride, allyl chloride, dichloroethylene, chloropropane, chlorobenzene, and the like. Depending upon the choice of treating agent, the treating temperature can vary somewhat. For example, vinyl chloride may require temperatures somewhat greater than 575° F. to undergo satisfactory decomposition to hydrogen chloride.

The time of the pretreatment will vary from about one minute to about 10 hours but will generally be less than about two hours. Some reduction in molybdenum or tungsten content of the catalyst is sometimes experienced as a result of the treatment. Consequently, treating time should not be excessive. The space velocity of the gaseous treating agent with regard to the catalyst bed will usually be within the range of about 100 to about 10,000 v./v./hr.

The treating gas can be diluted, if desired, with an inert gas such as nitrogen. In some cases, the treating gas can be diluted with the olefin feed. The treatment can be carried out in the same apparatus in which the catalyst activation or regeneration is carried out. For example, the catalyst in a fixed-bed or fluidized state, can be subjected to a flow stream of treating agent at the specified temperature and for the specified time. Following the treatment, the catalyst should be flushed to remove the treating agent. This can be done with an inert gas such as nitrogen or, more preferably, by the feed olefin itself at a rate which is temporarily higher than normal.

The unexpected nature of the results obtained with the above-described treating technique is emphasized by the fact that other hydrogen halides do not give beneficial results. When allyl iodide was used as the treating agent, no improvement was obtained. Hydrogen fluoride, when used, poisoned the catalyst substantially.

The catalysts which are useful for the present invention are those which have activity for the disproportionation of propylene into ethylene and butenes, usually referred to as the high temperature catalysts. Some examples of such catalysts are:

(1) Silica or thoria promoted by an oxide or compound convertible to an oxide by calcination or sulfide of tungsten or molybdenum or by an oxide or compound convertible to an oxide by calcination of rhenium, or tellurium; and (2) One or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten or rhenium or magnesium tungstate or beryllium phosphotungstate.

The catalysts of (1) can be prepared and activated by conventional techniques such as by combining a catalyst grade silica with suitable tungsten, molybdenum, rhenium, or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalyst compositions of (2) can be prepared and activated by conventional techniques. For example, molybdenum oxide can be coprecipitated with aluminum phosphate followed by calcination in air to produce an activated catalyst. Alternatively, the support material, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process using the catalysts of (2) will be carried out at a temperature of about 600 to 1200° F. In the process of the invention, pressures are not important but will be in the range of about 0 to 2,000 p.s.i.g.

Olefins applicable for use in the process of the invention are acyclic mono- and polyenes having at least 3 carbon atoms per molecule including the cycloalkyl and aryl derivatives thereof; cyclic mono- and polyenes having at least 4 carbon atoms per molecule, including the alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7,-diethyl-1,3,5-decatriene, 1,3,5,7,9-octadecapentaene, 1,3-eicosadiene, 4-octene, 3-eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

In the process wherein the catalyst of this invention is utilized, the olefins or mixtures of olefins are contacted with the pretreated olefin reaction catalyst at a temperature in the range of about 400 to 1200° F., at a pressure of about 0 to 2,000 p.s.i.g. and a reaction time in the range of about 0.1 second to 10 hours. With a fixed bed reactor and continuous operation weight hourly space velocities in the range of 0.5 to 1,000 parts by weight of hydrocarbon per part by weight of catalyst per hour with excellent results having been obtained in the range of 1 to 200.

The invention is further illustrated by the following specific embodiments which should be considered as exemplary and should not be construed so as to limit unduly the invention.

EXAMPLE I

A commercial tungsten oxide-silica catalyst (containing 7 weight percent tungsten oxide, and exhibiting a surface area of 291 m.²/g., a pore volume of 1.13 cc./g., and a pore diameter of 157 Angstroms) was reduced to 20–40 mesh particle size and charged into a 7 mm. ID quartz tube reactor to make a 1 cc. catalyst bed. After conventional activation in flowing air, the catalyst bed was tested briefly for activity at 932° F. and atmospheric pressure with a stream of propylene flowing at a gaseous rate of 15 v./v./minute. After the conversion level was established under these conditions, a stream of vinyl chloride, flowing at a rate of 5 v./v./minute, was blended with the olefin stream for a period of 35 minutes. The conversion of the propylene to ethylene and butenes after the vinyl chloride flow was halted was found to be dramatically increased. The testing conditions and results are shown in the following table.

| Time on stream | Space rate (v. g./v. cc./min.) Propylene | Vinyl-chloride | Temperature, °F. | Propylene conversion, percent |
|---|---|---|---|---|
| 15 min | 15 | 0 | 932 | 2 |
| 50 min | 15 | 0 | 1,022 | 9.3 |
| 1 hr. 15 min | 15 | 0 | 1,112 | 42 |
| 1 hr. 45 min | 15 | 0 | 1,022 | 9.5 |
| 2 hrs. 10 min | 15 | 5 | 932 | trace |
| 2 hrs. 45 min | 15 | 5 | 932 | trace |
| 3 hrs. 0 min | 15 | 0 | 932 | 42 |
| 3 hrs. 30 min | 30 | 0 | 932 | 41 |
| 3 hrs. 40 min | 60 | 0 | 932 | 51 |

It is seen from the table that the conversion at 932° F. and atmospheric pressure was relatively low under the conditions in which the non-treated catalyst was used. In this period before the catalyst was treated, the temperature of the bed was increased momentarily and then returned to the 932° F. level to show that there was no induction effect by which the activity of the catalyst was increased by mere aging. Thus, it is seen that the activity of the catalyst was increased from about 2 percent conversion to about 42 percent conversion by the above-described treatment with vinyl chloride.

EXAMPLE II

Utilizing the same procedure and same catalyst described in Example I, a run was carried out in which hydrogen chloride was the catalyst treating agent. At 932° F., the activated but otherwise untreated catalyst converted propylene at a 10.4 percent conversion. The propylene was admitted at a rate of 15 cc./minute. The propylene flow was then discontinued and hydrogen chloride, at a rate of about 15 cc./minute, was passed through the catalyst bed for 20 minutes, while the temperature was maintained at 932° F. The bed was then flushed with nitrogen and the propylene readmitted at 15 cc./minute. The propylene conversion at 932° F. was now found to be 44.8 percent as opposed to 10.4 percent before the treatment.

EXAMPLE III

Chloropropane was utilized as the treating agent with the same catalyst as in Example I. Under conditions essentially identical to those described in Example I above, the conversion of propylene was increased from 13.4 percent to 42.5 percent when tested at 932° F. and at a propylene flow rate of 13 cc./minute. The increase in conversion was due to a one hour and 20 minute treatment in which chloropropane was passed into the reactor, simultaneously with the propylene, at a liquid flow rate of 3 cc./hr.

EXAMPLE IV

Utilizing the same procedure and catalyst as in Example II, chlorobenzene was also found to be effective as a catalyst treating agent. The conversion of propylene to disproportionated products was increased from 12 percent to 21 percent when tested at a propylene flow rate of 10 cc./minute and at 932° F. The improvement was accomplished by passing chlorobenzene through the catalytic bed at a gaseous rate of 10 cc./minute for one hour.

Other tests showed that similar beneficial results in regard to catalyst activity were also obtained by treating the catalyst with cis-1,2-dichloroethylene and trans-1,2-dichloroethylene.

It will ordinarily be advantageous to re-treat the catalyst following regeneration because considerable effect of the treatment can be lost in the regeneration process.

That which is claimed is:

1. In an olefin reaction process wherein at least one olefin selected from the group consisting of cyclic and acyclic mono- and polyene olefin hydrocarbons and mixtures of at least one such olefin hydrocarbon and ethylene is contacted with a catalyst active for disproportionating propylene into ethylene and butene, comprising silica, thoria, zirconium phosphate, aluminum phosphate, titanium phosphate, magnesium phosphate or calcium phosphate promoted with a promoting amount of an oxide, sulfide or hexacarbonyl of tungsten or molybdenum or an oxide of rhenium or tellurium, under conditions, including conditions of temperature, pressure and contact time, suitable for obtaining a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, with the selected catalyst, the improvement comprising treating said catalyst with hydrogen chloride at a temperature within the range of about 575 to 1475° F. prior to utilizing said catalyst in said olefin reaction.

2. The process of claim 1 wherein the catalyst is treated with hydrogen chloride by contacting said catalyst with a hydrocarbon chloride decomposable to hydrogen chloride at a temperature sufficient to decompose the hydrocarbon chloride.

3. The process of claim 1 wherein propylene is disproportionated to ethylene and butenes.

4. The process of claim 1 wherein the catalyst is contacted with hydrogen chloride at a pressure of about 0 to 100 p.s.i.g. for a time in the range of about one minute to about 10 hours.

5. The olefin reaction of claim 1 wherein the temperature is in the range of about 400 to 1200° F., the pressure is in the range of about 0 to 1500 p.s.i.g., and the contact time is in the range of about 0.1 to 60 seconds.

6. The process of claim 1 wherein the catalyst is treated with hydrogen chloride by feeding hydrogen chloride in contact with the catalyst.

7. The process of claim 1 wherein the temperature suitable for obtaining an olefin reaction product is selected within the range of about 400 to 1200° F.

8. The process of claim 1 wherein said olefin is an acyclic monoolefin.

9. The process of claim 1 wherein said olefin is an acyclic monoolefin, the catalyst is silica promoted by an oxide of tungsten and the temperature suitable for obtaining an olefin reaction product is within the range of about 400 to 1100° F.

References Cited

UNITED STATES PATENTS

| | | | |
|---|---|---|---|
| 2,419,690 | 4/1947 | Pines et al. | 260—668 |
| 2,431,763 | 12/1947 | Mattox | 260—668 |
| 2,831,037 | 4/1958 | Schmerling | 260—668 |
| 3,365,513 | 1/1968 | Heckelsberg | 260—683 |

DELBERT F. GANTZ, Primary Examiner

C. E. SPRESSER, Jr., Assistant Examiner

U.S. Cl. X.R.

260—666, 668